H. CSANYI.
PRIMARY BATTERY.
APPLICATION FILED MAY 14, 1913
1,125,970.
Patented Jan. 26, 1915.
2 SHEETS—SHEET 1.
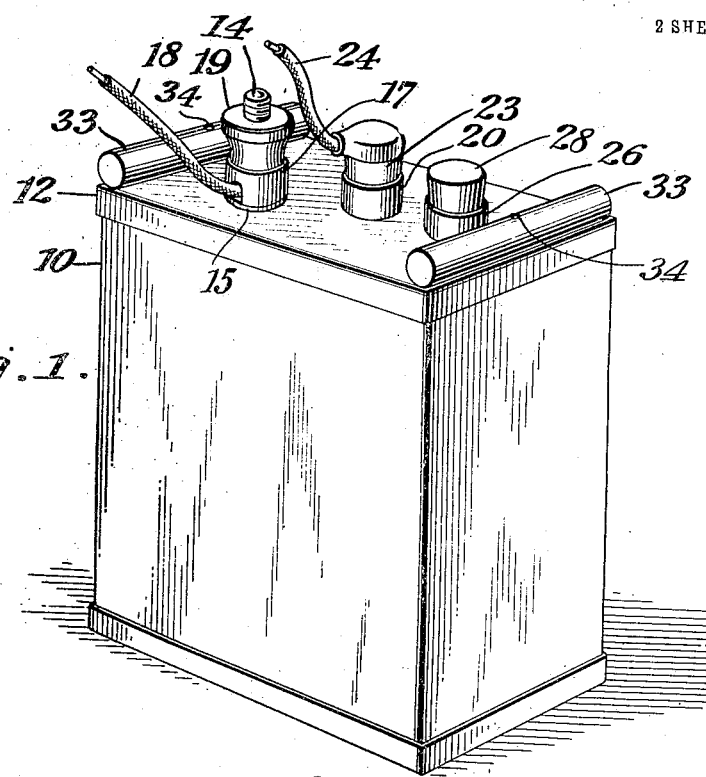
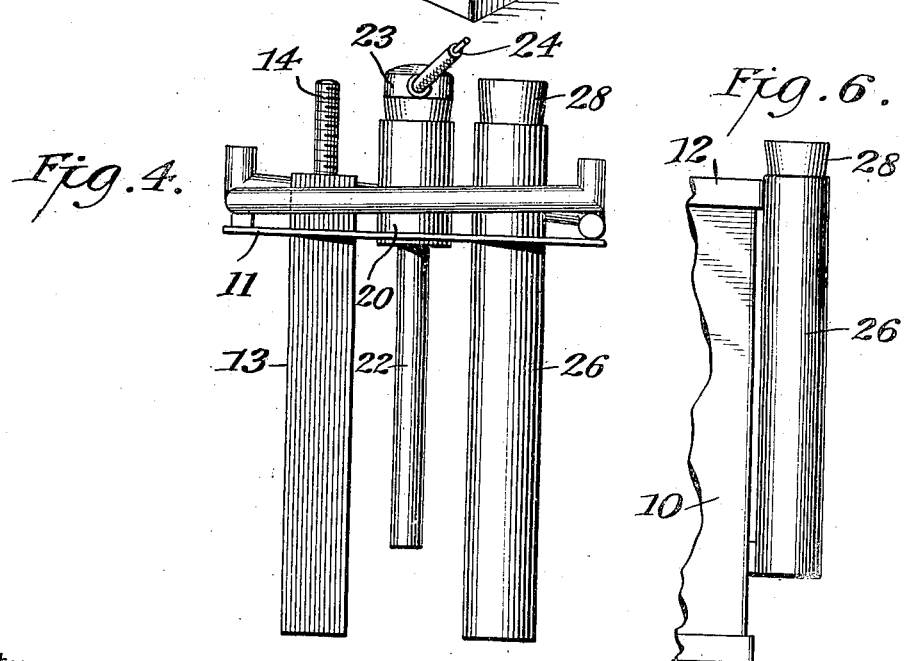
Witnesses:
A. R. Appleman
C. H. Bickerton
Inventor
Henry Csanyi
By his Attorneys
Meyers, Cushman & Rea H. CSANYI.
PRIMARY BATTERY.
APPLICATION FILED MAY 14, 1913.
1,125,970.
Patented Jan. 26, 1915.
2 SHEETS—SHEET 2.
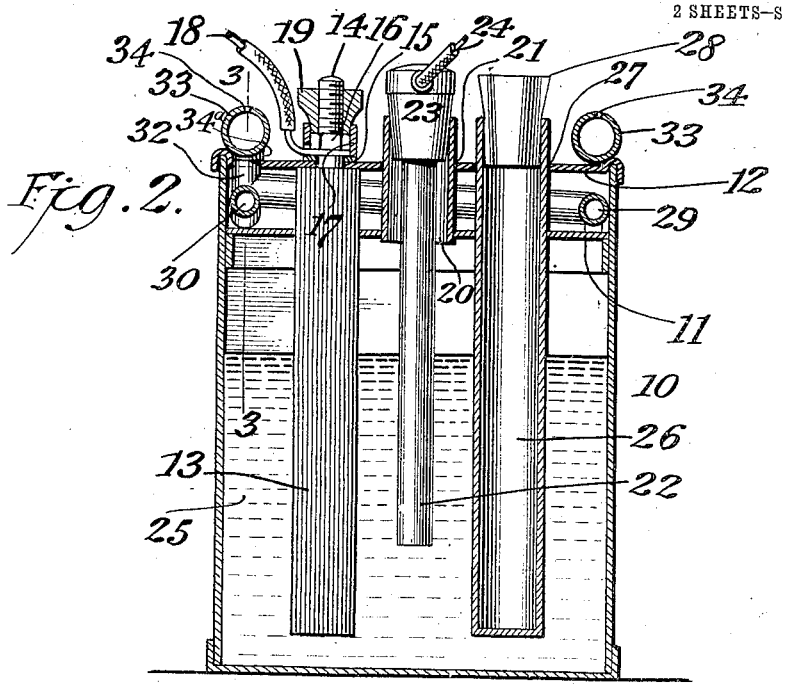
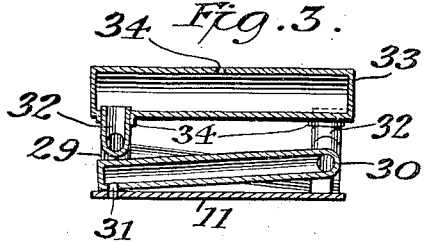
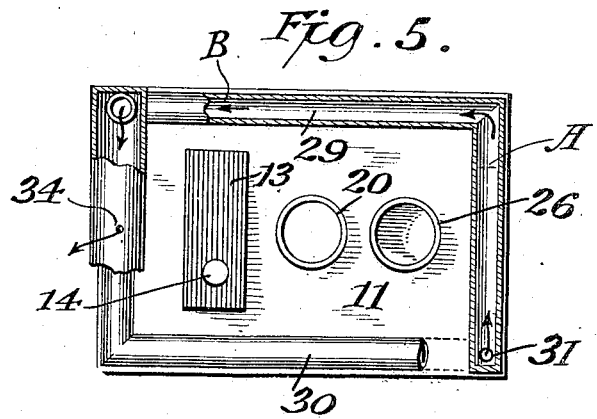
Witnesses:
A. R. Appleman
E. H. Bickerton
Inventor
Henry Csanyi,
By his Attorneys
Meyers, Cushman & Rea

UNITED STATES PATENT OFFICE.

HENRY CSANYI, OF NEW YORK, N. Y., ASSIGNOR TO MAXIVOLT PRIMARY BATTERY CO., OF NEW YORK, N. Y., A CORPORATION OF NEW JERSEY.

PRIMARY BATTERY.

1,125,970.   Specification of Letters Patent.   Patented Jan. 26, 1915.

Application filed May 14, 1913. Serial No. 767,693.

*To all whom it may concern:*

Be it known that I, HENRY CSANYI, a subject of the King of Hungary, residing at New York, in the county of New York and State of New York, have invented new and useful Improvements in Primary Batteries, of which the following is a specification.

This invention relates to a primary battery which may be employed wherever such batteries are needed, but which is designed more particularly as a portable battery, that may be shaken or upset while in use without danger to its contents falling out, spilling, or interrupting its operation.

The primary object of the present invention is to provide a battery which, while being tightly sealed to prevent the electrolyte escaping when turned from an upright position or severely shaken, is provided with a vent for the outlet of gases generated by chemical action of the elements, and having an opening for the insertion and removal of the zinc element, and the introduction of the electrolyte, and is also provided with a receptacle within or without the seal into which the zinc is placed when withdrawn from the battery.

In primary batteries having a liquid electrolyte the chemical action of the various elements generates more or less gases within the cell which must be permitted to escape. In batteries which are stationary or rarely moved this is provided for by leaving the cells open, but in portable batteries, such for instance as are carried on the person to generate current for a small electric light, and on automobiles and other types of vehicle, it becomes necessary to seal the batteries so that however much they may be turned from the upright position or shaken the electrolyte is prevented from escaping. This type of battery, however, must be provided with a vent to permit the escape of gas, and so arranged that the electrolyte cannot escape through said vent. To accomplish this object in the present invention tortuous passages have been arranged at the top of the battery connected at one end with the interior of the sealed cell, and opening at the other end into the atmosphere, said passages being so disposed that while free outlet for the gases is provided the batteries themselves may be inclined to any extent, and in fact turned on their side and severely shaken without danger of the electrolyte escaping through the vent provided for the gases. To make clear the means by which this object is accomplished in the present invention, attention is directed to the following detail description, and the drawings accompanying the same, in which—

Figure 1 is a perspective view of a battery complete. Fig. 2 is a vertical central sectional view of the same. Fig. 3 is a cross sectional view on the line 3—3 of Fig. 2. Fig. 4 is a side elevation illustrating the partition by which the cell is sealed, the elements of the battery mounted thereon and also the tortuous passages for permitting the outflow of gases. Fig. 5 is a top plan view partly in section of the details illustrated in Fig. 4. Fig. 6 is a view illustrating a modified construction.

In the drawings 10 designates the cell of the battery made preferably of celluloid or rubber and rectangular in cross section. Near the top of the cell is a closure preferably in the form of a horizontal partition 11 sealed in position in any approved manner to prevent the escape of the fluid electrolyte. A cover 12 closes the top of the cell and may be secured thereon by any suitable means. A negative element 13, such as carbon, projects downwardly from the partition 11 into the cell and is tightly sealed to said partition. A threaded metal stem 14 in electrical connection with said element extends through the cover 12 and has a washer 15 and nut 16 screwed thereon. Surrounding the nut is an annulus 17 having a notch in its side through which one of the conducting wires 18 passes and is secured on the stem 14 by a thumb nut 19. About the center of the partition a circular hole is made and a cylindrical sleeve 20 inserted therein and sealed fluid tight. The sleeve projects through a hole 21 in the cover and forms the means by which the positive or zinc element 22 of the battery is inserted into the cell. The zinc element 22 has a stopper 23, preferably of rubber attached to its upper end that fits tightly and packs the zinc in the sleeve and prevents the escape of electrolyte if the battery should be tilted or overturned. A conducting wire 24, connected to the zinc extends through the stopper 23. The exciting liquid or electrolyte 25 fills the cell to or nearly to the partition 11 and is poured into the cell through the sleeve 20 and when exhausted is emptied through the same passage. The zinc in this battery is very often removed when it is desired to cut off the circuit of the battery and to provide a place for storing the zinc, I prefer to provide a cylindrical water tight receptacle 26 closed on the bottom extending into the cell from the partition 11 to which it is secured fluid tight, and up through a hole 27 in the cover. A stopper 28 closes the upper end of the receptacle to prevent any fluid carried thereinto by the zinc from escaping should the battery be tilted. When the zinc is withdrawn from the cell, the stopper 28 is removed from the receptacle and inserted in the sleeve 20. The zinc is then placed in the receptacle and its stopper 23 pressed tightly within the mouth thereof.

A sealed primary battery using a liquid electrolyte must have a vent for the gases generated by the chemical action of the electrolyte on the elements, but this vent must be so arranged as to permit free escape of the gases without allowing the electrolyte to flow out of the cell when the latter is shaken or even overturned. This is accomplished by means of one or more circuitous passages between the partition 11 and the cover 12 communicating at one end with the interior of the cell, and at the opposite end with the atmosphere. As shown clearly in Figs. 2 to 5, inclusive, 29, 30, indicate circuitous tubes or ducts, each communicating at one end as at 31 with the interior of the cell 10 through a corner of the partition 11, said corners being diagonally opposite each other. These tubes each pass in opposite directions around two sides of the cell above the partition at a gradual upward inclination, each to a point above the inlet end of the other, where they turn in an upward direction and project a short distance through the cover 12. Connected to each upturned end 32 is a second transverse duct preferably in the form of an enlarged extension or cap tube 33 having a neck 34ª at one end on its under side into which said up-turned end 32 is fitted tightly, and extending horizontally across the top of the battery. The two cap tubes 33 lie parallel to each other and are closed at their ends, a small opening 34 being made in the upper side and preferably at an intermediate point on the length of each tube to form a vent for the gases generated in the cell. As is evident when the battery is in upright position, as shown the gases pass through the openings 31 into the tubes 29, 30, thence to the upright portions of each tube and into the cap tubes 33 passing out of the latter tubes through the vent 34. Should the battery be inclined out of perpendicular or even turned upon its side the electrolyte could not escape through the passages owing to their tortuous shape, but if turned sufficiently far or as mentioned upon one side, the electrolyte would rise up to about the point A, Fig. 5, in the tube, but not sufficiently high to flow around the vent and out into the cap tubes. Should the battery be turned to a position wherein the cap tubes 33 will lie in a horizontal position instead of vertically, as in Fig. 5, the electrolyte entering through the opening 31, will fill the horizontal portion of the tube 29 and rise in the vertical portion to about the point B, but not sufficiently high to enter the cap tube 33. These assumed positions are extremes, and a battery would very rarely be turned to such an extent but they show clearly how even when so turned the electrolyte is prevented from escaping. In any position in which the battery may be turned wherein the electrolyte enters either of the tubes 29 or 30, as soon as the battery is restored to an upright position the electrolyte owing to the inclination of the tubes, will immediately gravitate back into the cell.

As a modification the zinc receptacle 26 instead of projecting into the cell 10 may be attached to the outside thereof, as shown in Fig. 6. The preferred form, however, is to place this receptacle within the cell.

What I claim is:—

1. A battery cell having venting means in the top thereof, comprising oppositely disposed tubes each having an enlarged end extension, said tubes each communicating at one end with the gas space of the cell at diagonally opposite corners, and with the atmosphere through an aperture formed in the enlarged end extension at a point removed from the end thereof.

2. A primary battery comprising a substantially rectangular cell for the elements including a liquid electrolyte, a sealed partition extending across said cell near the top, a cover for the cell, a tube communicating with the interior of said cell through said partition near one corner of said cell and extending in the space between said partition and said cover to a point near the diagonally opposite corner, a second tube communicating with the interior of said cell through said partition at a point near one of the remaining corners of said cell and extending in the space between said cover and said partition to the diagonally opposite corner, a duct connected with each of said tubes at the end thereof remote from the partition, said ducts being closed, extending transversely of said cell and each having a vent at an intermediate point on the length thereof.

3. A primary battery comprising a substantially rectangular cell for the elements including a liquid electrolyte, said cell having a closure for the upper end thereof, said cell having a duct communicating with the interior of said cell near one corner thereof and extending to a point near the diagonally opposite corner of said cell, said cell having a second duct communicating with said first duct near one end of said second duct and extending transversely of said cell, said second duct being closed and having a vent at an intermediate point on the length thereof, said cell having a third duct communicating with the interior of said cell at one of the other corners of said cell and extending to a point near the diagonally opposite corner, a fourth duct communicating with said third duct near the end of said fourth duct and extending transversely to said cell, said fourth duct having a vent at an intermediate point on the length thereof.

4. A primary battery comprising a substantially rectangular cell for the elements including a liquid electrolyte, said cell having a closure for the upper end thereof, said cell having a duct communicating with the interior of said cell near one corner thereof and extending to a point near the diagonally opposite corner of said cell, said cell having a second duct communicating with said first duct near one end of said second duct and extending transversely of said cell, said second duct being closed and having a vent at an intermediate point on the length thereof, said cell having a third duct communicating with the interior of said cell at one of the other corners of said cell and extending to a point near the diagonally opposite corner, a fourth duct communicating with said third duct near the end of said fourth duct and extending transversely to said cell, said fourth duct having a vent at an intermediate point on the length thereof, said second and fourth ducts being disposed substantially parallel with the short sides of said rectangular cell.

5. A primary battery comprising a cell for the elements including a liquid electrolyte, a sealed partition extending across said cell near the top, a cover for the cell, two circuitous tubes each communicating at one end with the receptacle through diagonal corners of the partition and at their opposite end projecting through the cover, and a cap tube having an opening to the atmosphere connected to the projecting end of each tube.

6. A primary battery comprising a cell for the liquid electrolyte, a sleeve mounted in the upper wall of said cell, an element normally disposed within said cell in contact with said electrolyte, a yielding stopper carrying said element and normally plugging said sleeve, and a closed compartment open at its upper end and adapted to receive said element and hold said stopper as a plug in the upper end thereof, the interior of said compartment being cut off from communication with the liquid electrolyte.

7. A primary battery comprising a cell for the elements, a sealed partition extending across the same near the top, a tube communicating at each diagonal corner of said partition with the interior of the cell, each tube extending around two sides of the partition, and at an inclination thereto, the opposite ends of said tubes communicating with the atmosphere, each through a cap tube provided with a vent.

In testimony whereof I have hereunto set my hand in presence of two subscribing witnesses.

HENRY CSANYI.

Witnesses:
E. H. BICKERTON,
J. GRANVILLE MEYERS.